United States Patent Office 3,388,744
Patented June 18, 1968

3,388,744
TREATMENT OF OIL WELLS
Dorsey R. Fincher and James L. Williams, Houston, Tex., assignors, by mesne assignments, to Getty Oil Company, Los Angeles, Calif., a corporation of Delaware
No Drawing. Filed Mar. 28, 1966, Ser. No. 537,657
12 Claims. (Cl. 166—40)

ABSTRACT OF THE DISCLOSURE

A process for the treatment of wells to enhance their producing characteristics is provided. The process includes preheating the formation; preparing a hot aqueous solution of hydrochloric acid having an acid concentration of 8 to 15 percent by weight; injecting the hot aqueous solution into the formation to react with calcium sulfate deposits to form a reaction product; injecting water to dilute the solution sufficiently such that the concentration of the acid is less than about 6 percent by weight; and, removing the dilute solution from the formation. The reaction product is soluble in the hot medium; addition of the water serves to hold the reaction product in solution upon cooling, until such reaction product can be removed from the formation.

---

The invention concerns the treatment of oil and gas wells, particularly in regard to enhancing producing characteristics thereof by the removal of calcium sulfate deposits existing in the producing formation adjacent the well bore.

The rate of flow of oil and gas wells frequently declines with respect to time. One of the causes of such lessening of flow is that the pores of the producing formation adjacent the well bore become clogged with deposits of various materials, such as paraffin, calcium carbonate, iron sulfide, iron oxide, and the like. One process for attempting to enhance the producing characteristics of oil and gas wells is to "acidize" the wells, that is, to introduce into the wells a charge of an aqueous acid solution capable of dissolving the material forming the clogging deposit. Hydrochloric acid, usually in the form of commercial muriatic acid, is frequently employed for acidizing since it is relatively inexpensive, and since it can form soluble salts with many of the materials constituting the deposits. The acidizing process is successful in many instances.

In certain producing formations, however, calcium sulfate deposits accumulate in the producing strata and around the tubing and/or screening at the bottom of the well bore. As the calcium sulfate deposits build up, the flow of oil or gas from the well gradually decreases until the well becomes plugged. In the past, it has often been found necessary to pull the tubing and/or screening and break the deposit therefrom to remove the calcium sulfate deposit. Deposits of calcium sulfate in the formation have been found very difficult to remove, much more difficult than deposits of many other materials, such as calcium carbonate. U.S. Patent 2,386,605, which issued in the name of E. E. Harton, Jr. et al., on Oct. 9, 1945, states that "Ordinary reagents, such as hydrochloric acid are ineffective in removing this type of deposit [calcium sulfate] even when the reagent is hot and agitated."

The invention provides a process in accordance with which hydrochloric acid can be employed to remove deposits of calcium sulfate, as well as other salt deposits, from hydrocarbon-producing formations to enhance the producing characteristics of the formations.

In one embodiment of the invention, a process suitable for removal of calcium sulfate deposits from a hydrocarbon-producing formation comprises preparing an aqueous acidic solution having a temperature of at least about 175° F., preferably at least about 225° F., and having an acid concentration sufficient to react with calcium sulfate at a practical rate at a temperature of at least about 175° F. This solution may be prepared by mixing acid, preferably at ambient temperature, with hot water having a temperature sufficient to effect the 175° F. solution. For example, hydrochloric acid, such as commercial grade muriatic acid having 30 percent by weight acid concentration, at ambient temperature can be mixed with hot water having a temperature of approximately 250° F. or above in amounts sufficient to prepare the solution. An aqueous hydrochloric acid solution suitable for use in accordance with the invention should have an acid concentration between about 8 and about 15 percent by weight, preferably about 12 percent by weight, for best results in practical applications.

The acidic solution is injected into a hydrocarbon-producing formation, which has preferably been preheated to a temperature of at least about 175° F., in an amount sufficient to react with calcium sulfate deposits in the formation sufficiently to enhance ultimately the producing characteristics thereof. The formation can be preheated if necessary up to a temperature of at least about 175° F. to permit maintenance of a temperature in the formation during the reaction step of at least about 175° F. to effect a practical rate of reaction with the calcium sulfate deposits in the formation.

The formation may be preheated by the injection of hot water, such as steam or hot liquid water, prior to injection of the acid until the formation reaches a suitable preheated temperature. The injection of hot water also helps remove loose scale and hydrocarbon deposits prior to the injection of the acidic solution, and consequently enhances the effectiveness of the acidic solution by removing such materials which can constitute obstructions to the activity and effectiveness of the acidic solution with respect to the calcium sulfate deposits.

Hot liquid water at a temperature of at least about 175° F., preferably at least about 250° F., is preferably injected into the well bore and consequently the formation to accomplish the preheating step. Of course, hot liquid water at temperatures around 250° F. may vaporize into steam before or during contact with the formation depending on the pressures thereon. Other heating media, however, may be employed.

After injection of the acidic solution into the formation, it is necessary to inject water, either steam, hot liquid water, or water at ambient temperature, into the formation to dilute the aqueous acidic solution therein sufficiently to form a dilute solution having an acid concentration sufficiently low to dissolve the reaction product of the calcium sulfate deposit with the acid in the acidic solution. It has been discovered that the reaction product is a complex calcium compound which precipitates from an acidic solution having an acid concentration sufficiently high to react with calcium sulfate at a practical rate. Consequently, without the dilution step the complex compound merely precipitates back into the formation as the acidic solution cools and the producing characteristics are not enhanced adequately by the mere addition of acid. With a hydrochloric acid solution as the reactive acidic solution, sufficient water should be added to dilute this solution to an acid concentration of less than about 6 percent by weight.

After the dilute solution is formed, it may be removed by pumping the well or permitting it to flow, whereby dissolved calcium sulfate and its calcium complex reaction product is removed from the formation and the well bore.

Although hydrochloric acid is preferred for use in the process of the invention, other suitable acids may also be employed. Of course, these other acids may require particular acid concentrations in order to react with calcium sulfate at a practical rate and in a practical quantity, and to effect removal of the calcium sulfate or a resultant calcium complex compound.

In preferred practice of the invention, acid having a concentration suitable for shipment and storage, such as commercial grade muriatic acid having at least about 30 percent by weight acid concentration, is mixed with hot water near the well bore to form the hot reactive solution immediately prior to injection and is then injected into the well bore and consequently the producing formation. This may be accomplished by employing two tanks at the surface, one of which holds water and can be heated, and the other of which stores acid at ambient temperature, which have lines meeting in a common header which in turn is connected to a conduit in the well bore, such as a tubing string or the annulus in the casing. The mixing of acid at ambient temperature into hot water immediately prior to introduction into the well bore eliminates storage and unnecessary handling of hot acid along with the attendant safety and corrosion problems. Consequently, the acid is preferably maintained at ambient temperature until it is being injected into the well bore, and the only solution heated in a conventional sense is water. The water is preferably heated to temperatures of between about 250° F. and about 350° F. depending of course on the amount of heat necessary to make an acidic solution having a temperature of at least about 175° F. to effect a practical rate of reaction with calcium sulfate.

Preferred practice is to maintain all heated materials at the surface as liquids to provide safe and convenient operation. The liquids, of course, by the time they reach the producing formation may turn into a vapor state. For example, acid may be heated by introducing steam into the acid at the surface and then injecting the resulting solution into the well bore for the purposes described hereinbefore. This practice, however, requires more sophisticated equipment, and is not as safe as the mixing of hot liquid water with acid at ambient temperature to effect the desired reactive solution described above.

The dilution step may be accomplished by injecting water at ambient temperature, or steam, or hot liquid water, into the producing formation. Of course, by the time the water enters the formation, it will assume some temperature above ambient from heat transferred due to contact with the heated conduits and formation.

A process in accordance with the invention is relatively inexpensive and can enhance the producing characteristics of a hydrocarbon-producing formation containing calcium sulfate deposits markedly. The process is convenient to use and is as safe as one can expect when employing hot acid near a well site. In addition, one can employ conventional, inexpensive equipment to accomplish the process.

For example, a pump truck may be employed to store 30 percent acid at ambient temperature and pump the acid into a line leading to the well. A hot oil truck may be employed to heat water to approximately 250° F. or above and pump the resulting hot water to the same line leading to the well. The acid and the hot water will then be mixed in the line immediately preceding the well with a minimum of exposure of equipment to hot acid and with a maximum of safety. The flow rate from the two trucks can be regulated to achieve a hot acid solution having the proper acid concentration and temperature for calcium sulfate removal.

Although the specific procedure to be employed in regard to a particular well should be tailored for the well, a suitable procedure may be as follows:

Sixty barrels of fresh water can be preheated to a temperature of 250° F. in a hot oil truck. Twenty barrels of the hot water can then be injected into the well bore and consequently the formation at a rate of two barrels per minute, for example, to preheat the formation. Then 30 percent hydrochloric acid in a pump truck storing the acid at ambient temperature can be injected into a line while injecting hot water from the hot oil truck into the same line. The rates of flow from the two trucks can be regulated to effect an acidic solution containing approximately 12 percent acid and having a temperature of approximately 225° F. A suitable injection rate of the resulting acidic solution could be 2.5 barrels per minute. After injection of the resulting acidic solution into the formation, an additional twenty barrels of water at a temperature of 250° F. may be injected from the hot oil truck into the well bore and the formation. If additional water is necessary, water from a pump truck can be injected into the formation to dilute the acid solution sufficiently to dissolve calcium complex compounds which tend to precipitate in acidic solutions.

Several producing wells in fields having calcium sulfate deposits have been treated in accordance with the above procedure with successful results. The acid employed was hydrochloric acid and the solution injected into the well was approximately a 12 percent by weight acid solution at a temperature of approximately 225° F. After the treatment, production from the wells increased from double the production prior to treatment to five times the production prior to treatment.

The reactive acidic solution described herein has not been found to be unduly corrosive to lines, tubing, screens, etc., with which it comes in contact. Suitable corrosion inhibitors as well as other additives, however, can be added to the solution if desired to impart particular properties.

During the preheating and treating stages, of course, other additives such as surfactants and the like, may be added to the injected water and/or the acidic solution to impart particular properties without affecting the process of the invention.

What is claimed is:

1. A process suitable for enhancing the producing characteristics of a hydrocarbon-producing formation near a well bore by removal of at least some of the calcium sulfate deposits therein; which process comprises injecting into a hydrocarbon-producing formation hot water having a temperature of at least about 175° F. for a time sufficient to preheat said formation; preparing an aqueous solution of hydrochloric acid having a temperature of at least about 175° F. and having an acid concentration of between about 8 and about 15 percent by weight, by mixing hydrochloric acid at substantially ambient temperature with hot water having a temperature sufficient to effect said solution; injecting said aqueous solution of hydrochloric acid into said formation in an amount sufficient to react with calcium sulfate deposits in said formation sufficiently to enchance producing characteristics; after injection of said aqueous solution injecting water into said formation in an amount sufficient to dilute said aqueous solution to form a dilute solution having an acid concentration below about 6 percent by weight, to thereby retain the reaction product of calcium sulfate and said aqueous solution in solution, thereby to enhance producing characteristics; and removing said dilute solution from said formation.

2. The process defined in claim 1 wherein said hydrochloric acid at substantially ambient temperature is hydrochloric acid having an acid concentration greater than 15 percent by weight and preferably at least about 30 percent by weight, said hot water has a temperature of at least about 250° F., and said hydrochloric acid and said hot water are mixed in a line near the well bore communicating with said formation.

3. The process defined in claim 2 wherein said aqueous solution has a temperature of at least about 225° F.

4. A process suitable for enhancing the producing characteristics of a hydrocarbon-producing formation near a well bore by removal of at least some of the calcium sulfate deposits therein; which process comprises preparing an aqueous solution of hydrochloric acid having a temperature of at least about 175° F. and having an acid concentration of between about 8 and about 15 percent by weight; injecting said aqueous solution of hydrochloric acid into said formation in an amount sufficient to react with calcium sulfate deposits in said formation sufficiently to enhance producing characteristics; after injection of said aqueous solution injecting water into said formation in an amount sufficient to dilute said aqueous solution to form a solution sufficiently dilute to retain reaction product of calcium sulfate and said aqueous solution in solution, thereby to enhance producing characteristics; and removing said dilute solution from said formation.

5. The process defined in claim 4 wherein said aqueous solution of hydrochloric acid is prepared by mixing hydrochloric acid at substantially ambient temperature with hot water having a temperature sufficient to effect said solution.

6. The process defined in claim 5 wherein said hydrochloric acid at substantially ambient temperature is hydrochloric acid having an acid concentration greater than 15 percent by weight and preferably at least about 30 percent by weight, said hot water has a temperature of at least about 250° F., and said hydrochloric acid and said hot water are mixed in a line near the well bore communicating with said formation.

7. The process defined in claim 6 wherein said aqueous solution has a temperature of at least about 225° F.

8. The process defined in claim 4 wherein said dilute solution has an acid concentration below about 6 percent by weight.

9. The process defined in claim 4 wherein the acid concentration of said aqueous solution is about 12 percent by weight.

10. A process suitable for enhancing the producing characteristics of a hydrocarbon-producing formation near a well bore by removal of at least some of the calcium sulfate deposits therein; which process comprises injecting into a hydrocarbon-producing formation a heated fluid having a temperature of at least about 175° F. for a time sufficient to preheat said formation; preparing an aqueous solution of hydrochloric acid having a temperature of at least about 175° F. and having an acid concentration of between about 8 and about 15 percent by weight; injecting said aqueous solution of hydrochloric acid into said formation in an amount sufficient to react with calcium sulfate deposits in said formation sufficiently to enhance producing characteristics; after injection of said aqueous solution injecting water into said formation in an amount sufficient to dilute said aqueous solution to form a dilute solution having an acid concentration below about 6 percent by weight, to thereby retain the reaction product of calcium sulfate and said aqueous solution in solution, thereby to enhance producing characteristics; and removing said dilute solution from said formation.

11. The process defined in claim 10 wherein said heated fluid is steam.

12. The process defined in claim 10 wherein said heated fluid is hot water.

References Cited

UNITED STATES PATENTS

| | | | |
|---|---|---|---|
| 1,809,546 | 6/1931 | Bowman | 166—44 X |
| 1,999,146 | 4/1935 | Ambrose et al. | 166—42 |
| 2,059,459 | 11/1936 | Hund et al. | 166—42 X |
| 2,128,161 | 8/1938 | Morgan. | |
| 2,675,083 | 4/1954 | Bond et al. | 166—40 |
| 2,877,848 | 3/1959 | Case | 166—42 |
| 2,975,834 | 3/1961 | West et al. | 166—39 X |
| 3,070,164 | 12/1962 | Gordon | 166—42 X |

STEPHEN J. NOVOSAD, *Primary Examiner.*